United States Patent
Kitamura et al.

(10) Patent No.: US 10,220,913 B2
(45) Date of Patent: Mar. 5, 2019

(54) BICYCLE CHAIN TENSIONER DEVICE

(75) Inventors: Satoshi Kitamura, Osaka (JP);
Shintaro Mori, Osaka (JP)

(73) Assignee: Shimano Inc., Osaka (JP)

( * ) Notice: Subject to any disclaimer, the term of this patent is extended or adjusted under 35 U.S.C. 154(b) by 831 days.

(21) Appl. No.: 13/162,710

(22) Filed: Jun. 17, 2011

(65) Prior Publication Data

US 2012/0322594 A1  Dec. 20, 2012

(51) Int. Cl.
| | |
|---|---|
| *B62M 9/121* | (2010.01) |
| *B62J 6/06* | (2006.01) |
| *B62J 6/10* | (2006.01) |
| *B62M 6/70* | (2010.01) |
| *B62M 6/90* | (2010.01) |
| *B62M 9/122* | (2010.01) |
| *B62M 9/16* | (2006.01) |
| *B62M 25/08* | (2006.01) |

(52) U.S. Cl.
CPC ............... *B62M 9/121* (2013.01); *B62J 6/06* (2013.01); *B62J 6/10* (2013.01); *B62M 6/70* (2013.01); *B62M 6/90* (2013.01); *B62M 9/122* (2013.01); *B62M 9/16* (2013.01); *B62M 25/08* (2013.01)

(58) Field of Classification Search
CPC ........ B62M 9/121; B62M 25/08; B62M 9/16; B62M 9/122; B62M 6/90; B62M 6/70; B62J 6/06; B62J 6/10
USPC .............................. 474/69, 101, 110, 80–82
See application file for complete search history.

(56) References Cited

U.S. PATENT DOCUMENTS

| | | | |
|---|---|---|---|
| 5,470,277 A * | 11/1995 | Romano | 474/70 |
| 5,480,356 A * | 1/1996 | Campagnolo | 474/70 |
| 6,204,775 B1 | 3/2001 | Kubacsi | |
| 6,380,731 B1 | 4/2002 | Nishimoto | |
| 2004/0063528 A1 * | 4/2004 | Campagnolo | 474/70 |
| 2004/0220712 A1 * | 11/2004 | Takeda et al. | 701/35 |
| 2004/0232880 A1 | 11/2004 | Nyachoto | |
| 2006/0183584 A1 * | 8/2006 | Fukuda | 474/70 |
| 2006/0226879 A1 * | 10/2006 | Kitamura | 327/94 |
| 2006/0240920 A1 * | 10/2006 | Urabe | 474/80 |
| 2006/0285343 A1 * | 12/2006 | Okajima et al. | 362/473 |
| 2008/0066984 A1 | 3/2008 | Holland | |
| 2010/0113200 A1 * | 5/2010 | Yamamoto | 474/133 |
| 2012/0322591 A1 * | 12/2012 | Kitamura et al. | 474/80 |

FOREIGN PATENT DOCUMENTS

| | | |
|---|---|---|
| DE | 41 09 006 A1 | 9/1992 |
| EP | 2 189 367 A1 | 5/2010 |

OTHER PUBLICATIONS

European Search Report of corresponding EP Application No. 11 18 8310.4 dated May 7, 2012.

\* cited by examiner

*Primary Examiner* — Michael R Mansen
*Assistant Examiner* — Juan J Campos, Jr.
(74) *Attorney, Agent, or Firm* — Global IP Counselors, LLP

(57) ABSTRACT

A bicycle chain tensioner device is basically provided with a base member, a pulley and an electrical storage unit. The pulley is supported by the base member. The pulley includes a dynamo that generates electrical energy in response to the pulley being rotated by a bicycle chain. The electrical storage unit is disposed on the base member and electrically coupled to the dynamo to store electrical energy generated by the dynamo.

16 Claims, 5 Drawing Sheets

BICYCLE CHAIN TENSIONER DEVICE

BACKGROUND

1. Field of the Invention

This invention generally relates to a bicycle chain tensioner device. More specifically, the present invention relates to a bicycle chain tensioner device that generates electrical energy.

2. Background Information

Recently, bicycles have been equipped with various electrical components to make riding easier and more enjoyable for the rider. Some bicycles are equipped with electrically controlled shifting systems. These electrically controlled shifting systems can be automatically operated based on bicycle riding conditions or can be manually operated by the rider as desired. Such electrically controlled shifting systems require electricity from a power source to operate. Some bicycles are provided with a battery as a power source for the electrical components. Some bicycles are provided with a wheel hub generator as a power source for the electrical components. In any case, an electrical power source is needed for bicycles equipped with various electrical components.

SUMMARY

One aspect presented in this disclosure is to provide a bicycle chain tensioner device that generates electrical energy for electrical bicycle components.

In view of the state of the known technology, a bicycle chain tensioner device is provided that basically comprises a base member, a pulley and an electrical storage unit. The pulley is supported by the base member. The pulley includes a dynamo that generates electrical energy in response to the pulley being rotated by a bicycle chain. The electrical storage unit is disposed on the base member and electrically coupled to the dynamo to store electrical energy generated by the dynamo.

These and other objects, features, aspects and advantages of the bicycle chain tensioner device will become apparent to those skilled in the art from the following detailed description, which, taken in conjunction with the annexed drawings, discloses one illustrative embodiment of the bicycle chain tensioner device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
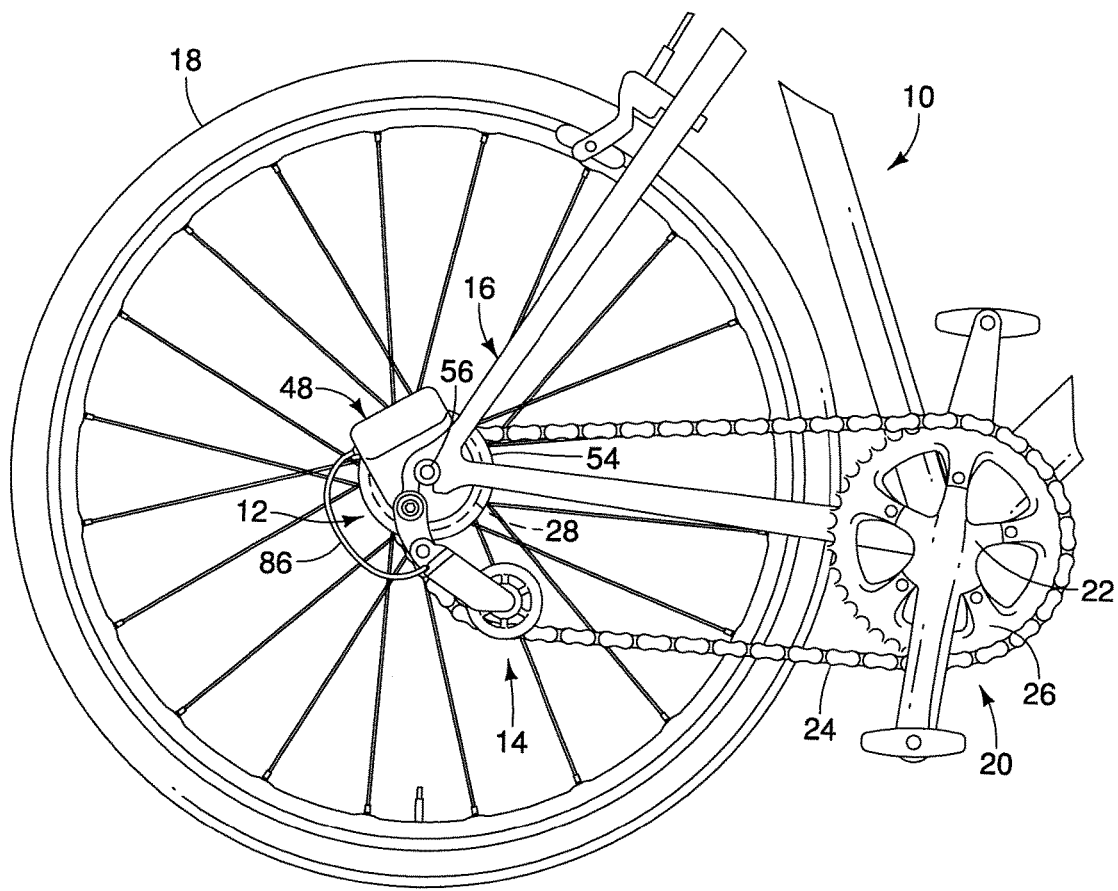
FIG. 1 is a partial side elevational view of a rear portion of the bicycle that is equipped with an internal hub transmission (e.g., an internally geared hub) and a bicycle chain tensioner device that generates electrical power for electrical components of the bicycle in accordance with one illustrative embodiment.

Referring initially to FIG. 1, a portion of a bicycle 10 is illustrated that is equipped with an internally geared hub 12 and a bicycle chain tensioner device 14 in accordance with one illustrated embodiment. As explained below, the bicycle chain tensioner device 14 generates electrical power for at least the internally geared hub 12, which is an electrically operated device. The internally geared hub 12 is mounted on a rear portion of a bicycle frame 16 of the bicycle 10. The internally geared hub 12 also forms a part of a rear wheel 18 of the bicycle 10. Also the internally geared hub 12 forms a part of a drive train 20 of the bicycle 10. Typically, in addition to the internally geared hub 12, the drive train 20 further includes a front crankset 22 and a chain 24. The chain 24 is a conventional bicycle chain that engages a chain ring 26 of the front crankset 22 and a rear drive sprocket 28 of the internally geared hub 12.

Figure 2:
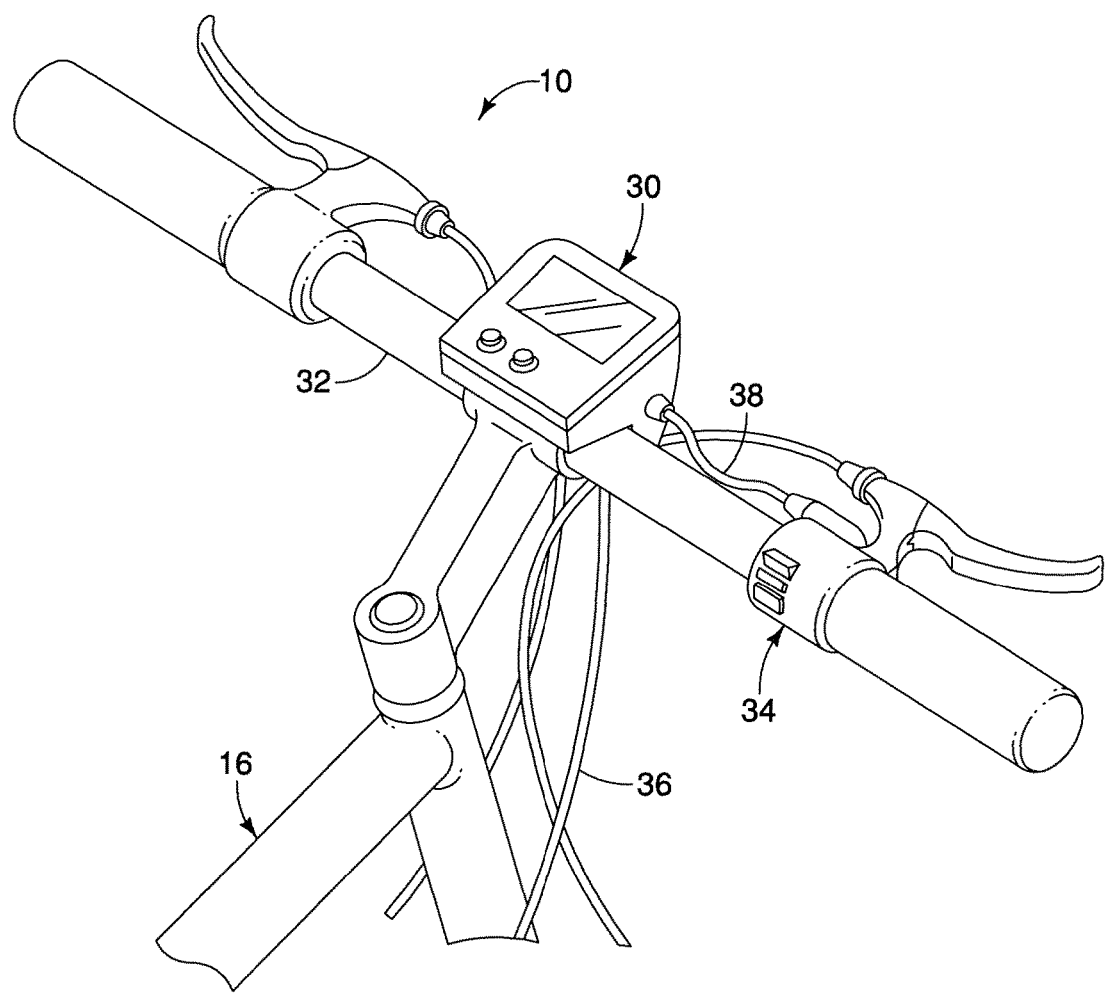
FIG. 2 is a perspective view of the handlebar area of the bicycle illustrated in FIG. 1, with a control unit and a plurality of operating or input devices mounted to a straight type handlebar.

As seen in FIG. 2, the bicycle 10 further includes a computer unit 30 that is mounted to a handlebar 32 of the bicycle 10. The computer unit 30 is preferably a bicycle computer that measures, calculates and displays various riding parameters such as bicycle speed, distance traveled, pedaling speed, pedaling cadence etc. The computer unit 30 includes a microcomputer with control circuits having one or more CPUs, storage units, computation units and the like. The microcomputer also includes software that outputs the predetermined parameters in accordance with the input signals outputted from the input device 34 and other input devices (not shown).

As seen in FIG. 2, the computer unit 30 may be operatively connected to the internally geared hub 12 by a remote input device 34. The input device 34 is preferably mounted on the handlebar 32 of the bicycle 10, but could be mounted in other places as needed and/or desired. The input device 34 constitutes one example of a manually operated input member in the form of switches. The input device 34 selectively output input signals to the bicycle chain tensioner device 14 to change a shift setting of the internally geared hub 12. The computer unit 30 is not necessary for the operation of the internally geared hub 12. The term "signal" as used herein is not limited to an electrical signal, but includes other types of signals such as a command.

As seen in FIG. 2, the computer unit 30 may be connected to the bicycle chain tensioner device 14 by a wiring harness 36 and to the input device 34 by a wire 38. Thus, the input signals outputted from the input device 34 can be relayed to the internally geared hub 12 by the computer unit 30 as needed and/or desired. However, the input device 34 can be configured to send signals directly to the bicycle chain tensioner device 14 as needed and/or desired. The input device 34 can be connected to the bicycle chain tensioner device 14 by a wire or through wireless communications. When the input device 34 is connected to the bicycle chain tensioner device 14 by wireless communications, the wiring harness 36 and the wire 38 are not needed.

Figure 3:
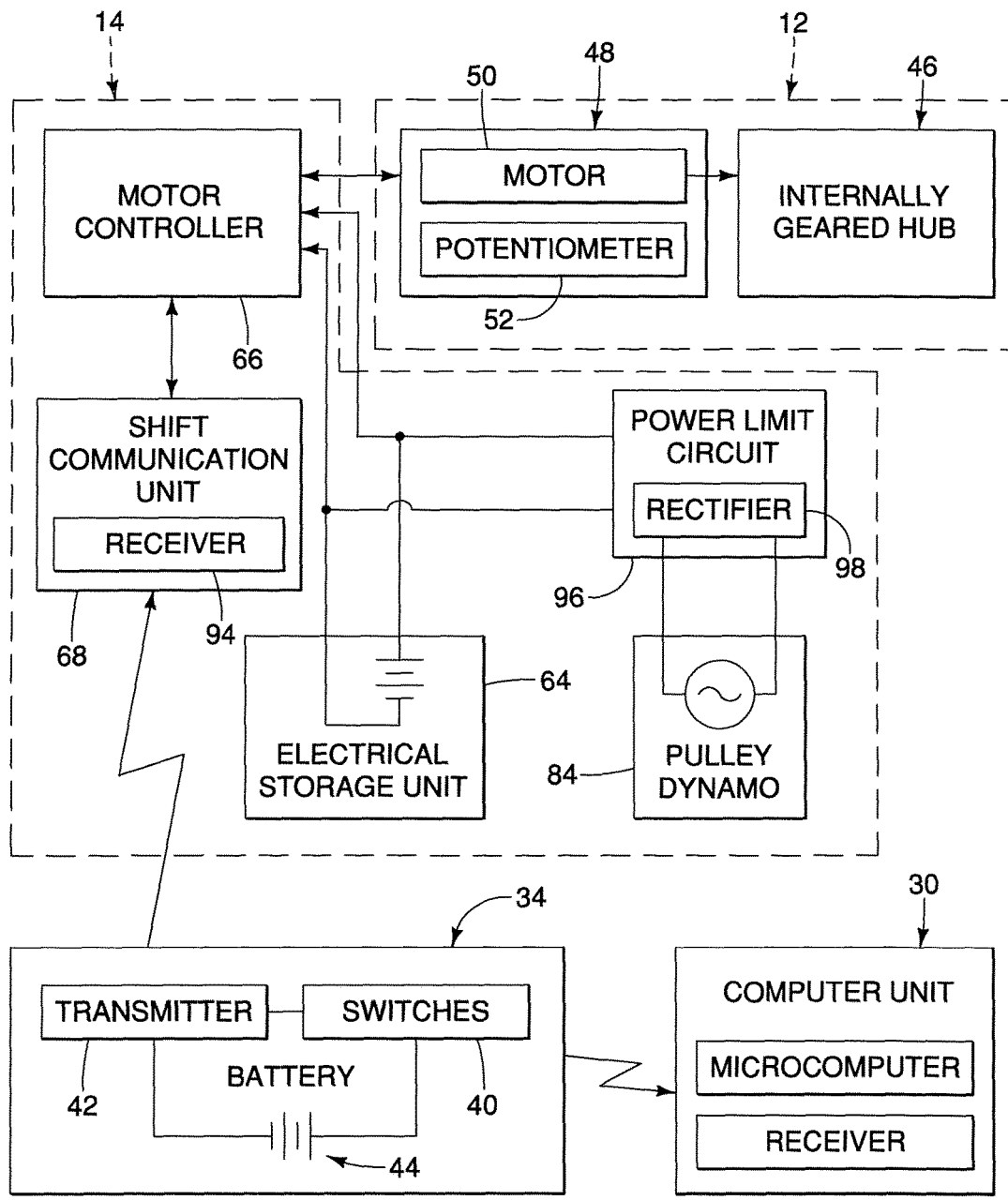
FIG. 3 is a schematic block diagram showing an entire configuration of the bicycle component control apparatus.

As seen in FIG. 3, the input device 34 can wirelessly communicates directly with the internally geared hub 12 and directly with the computer unit 30. In this situation, the computer unit 30 does not communicate with the bicycle chain tensioner device 14. When the input device 34 wirelessly communicates directly with the internally geared hub 12, the input device 34 is preferably provided with one or more switches 40 and a transmitter 42 for wirelessly outputting switch signals (e.g., upshift and downshift signals) to change the speed stage of the internally geared hub 12. Preferably, the input device 34 also includes a battery or power supply 44 that serves as a power source for the switches 40 and the transmitter 42. The battery 44 can be, for example, a nickel hydrogen battery or a lithium ion battery that is either replaceable or rechargeable.

Referring back to FIG. 3, the internally geared hub 12 includes a conventional. bicycle hub transmission 46 that is provided with an electric motor unit 48 such as a hub transmission sold by Shimano, Inc. under the brand name Nexus®. The hub transmission 46 has a plural speed stages, such as 3, 8, 10 or 11 speed stages et al. The electric motor unit 48, illustrated herein can be, for example, constructed as shown in U.S. Pat. No. 6,380,731. As shown in. FIG 7, the hub transmission 46 basically includes a hub shell 54, a hub axle 56 and a planetary gear transmission (not shown). The hub shell 54 rotates around the hub axle 56 with the planetary gear transmission (not shown) operatively disposed between the hub shell 54 and the hub axle 56. The hub axle 56 defines an axle or rotational axis of the hub shell 54 of the internally geared hub12. The rear drive sprocket 34 applies a driving force from the chain 24 to the planetary gear transmission (not shown) located within the hub shell 48 for communicating the drive force from the chain 24 to the hub shell 48 through a plurality of power transmission paths in a well known manner. Since hub transmissions and electric motor units are known structures, a detailed description of the hub transmission 46 and the electric motor unit 48 shall be omitted for the sake of brevity. The internally geared. hub 12 constitutes one example of an internal hub unit. A conventional hub brake (not shown) also can be used with the internally geared hub 12 as needed and/or desired. One example of such a conventional hub brake is sold Shimano, Inc. under the brand name Nexus®.

Referring again to FIG. 3, the electric motor unit 48 includes an electric motor 50 and a potentiometer 52. The electric motor 50 is, e.g., a DC motor or a three-phase brushless DC motor with a gear reduction unit (not shown). If an AC motor is used for the electric motor 50, then the electric motor unit 48 will typically include an inverter that converts DC current supplied to the electric motor unit 48 to an AC current for powering the electric motor 50. The potentiometer 52 is preferably coupled to a moving part of the gear reduction unit of the electric motor 50. The potentiometer 52 provides a signal indicating a current position of moving part of the gear reduction unit such that the electric motor unit 48 can be operated to upshift and downshift the internally geared hub 12 based on the switch signals from the switches 40. Alternatively, instead of using the potentiometer 52, a magnet and a hall effect sensor or device may be used for detecting a current position of the gear stage.

Figure 4:
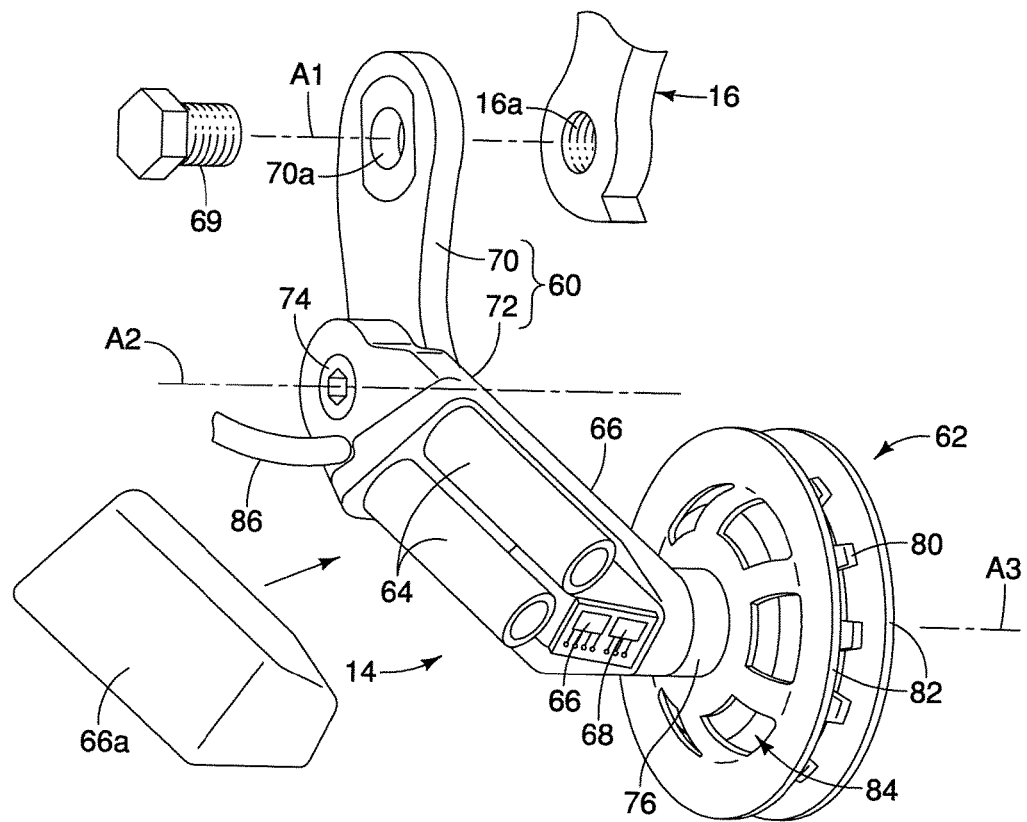
FIG. 4 is a perspective view of the bicycle chain tensioner device, with a cover removed and showing the bicycle chain tensioner device about to be mounted to a hanger portion of the bicycle frame.
Figure 5:
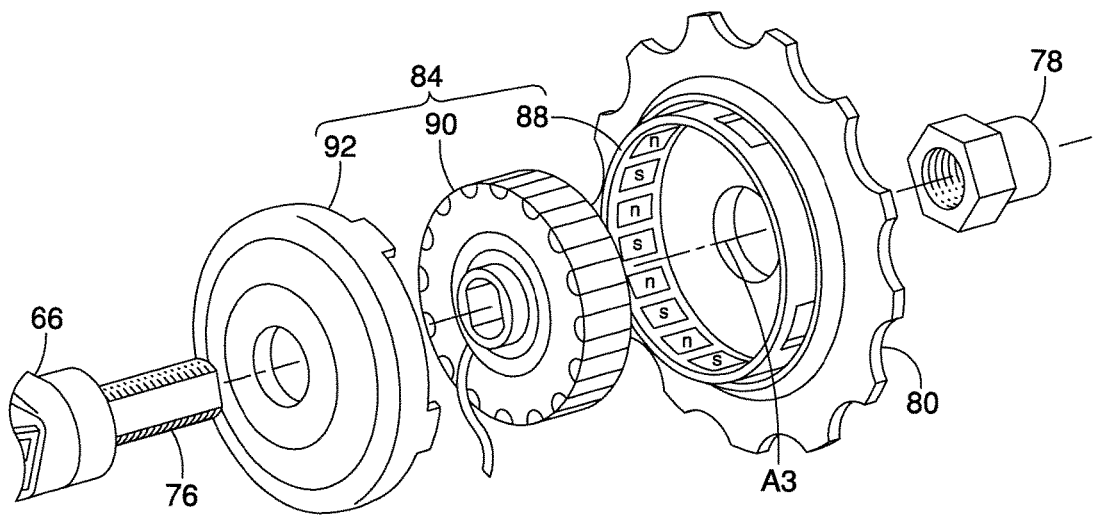
FIG. 5 is an exploded perspective view of the pulley of the bicycle chain tensioner device to show the dynamo.

Referring now to FIGS. 4 and 5, the bicycle chain tensioner device 14 basically includes a base member 60, a pulley member 62, an electrical storage unit 64, a motor controller 66 and a shift communication unit 68. Basically, the bicycle chain tensioner device 14 generates electrical power using the chain 24 which rotates the pulley member 62 and stores the electrical power in the electrical storage unit 64, as discussed below. Also basically, the shift communication unit 68 receives switch signals from the switches 40 for outputting the control signals to the motor controller 66 for controlling the operation of the electric motor unit 48. In other words, the shift communication unit 68 is operatively coupled to the motor controller 66 to transmit a motor operation signal from the shift communication unit 68 to the motor controller 66 such that the motor controller 66 operated of the electric motor unit 48 to shift the internally geared hub 12. In this way, the rider can easily upshift and downshift the internally geared hub 12 by using the switches 40.

As seen in FIG. 4, the base member 60 is detachably fixed to the bicycle frame 16 in a conventional manner, e.g., by a frame attachment bolt 69 that is threaded onto a threaded hole 16a of frame 16. The frame attachment bolt 69 defines a mounting axis A1 of the base member 60. The pulley member 62 is rotatably coupled to the base member 60. Also the electrical storage unit 64, the motor controller 66 and the shift communication unit 68 are all disposed on the base member 60. In the illustrated embodiment, the base member 60 basically includes a frame attachment portion 70 (e.g., a bracket member) and an arm portion 72.

The frame attachment portion 70 is a hard, rigid member formed of a suitable material such as a metal plate, a reinforced carbon fiber member, etc. The arm portion 72 has a first end that is fixedly secured to the frame attachment portion 70 by a bolt 74, and a second end that rotatably supports the pulley member 62. The arm portion 72 extends in a prescribed direction between its first and second ends. The bolt 74 extends in a direction transverse to the prescribed direction between its first and second ends of the arm portion 72 to define a rotational axis A2. The bolt 74 allow for a position of the arm portion 72 to be adjusted relative to the frame attachment portion 70 about the rotational axis A2. In particular, the bolt 74 extends through a bore of the arm portion 72 and threads into a threaded hole (not shown) of the frame attachment portion 70 for selectively clamping the arm portion 72 against the frame attachment portion 70 in a plurality of tensioner positions. In other words, to adjust the position of the pulley member 62 relative to the frame attachment portion 70 after the frame attachment portion 70 is fixed to the frame 16, the rider can partial unthread the bolt 74 so that the arm portion 72 can swing relative to the frame attachment portion 70 and then retighten the bolt 74 once the arm portion 72 is in the desired location. In this way, the frame attachment portion 70 can remain fixed to the frame 16 while the arm portion 72 is adjusted relative to the frame attachment portion 70 for adjusting a position of the pulley member 62.

Figure 6:
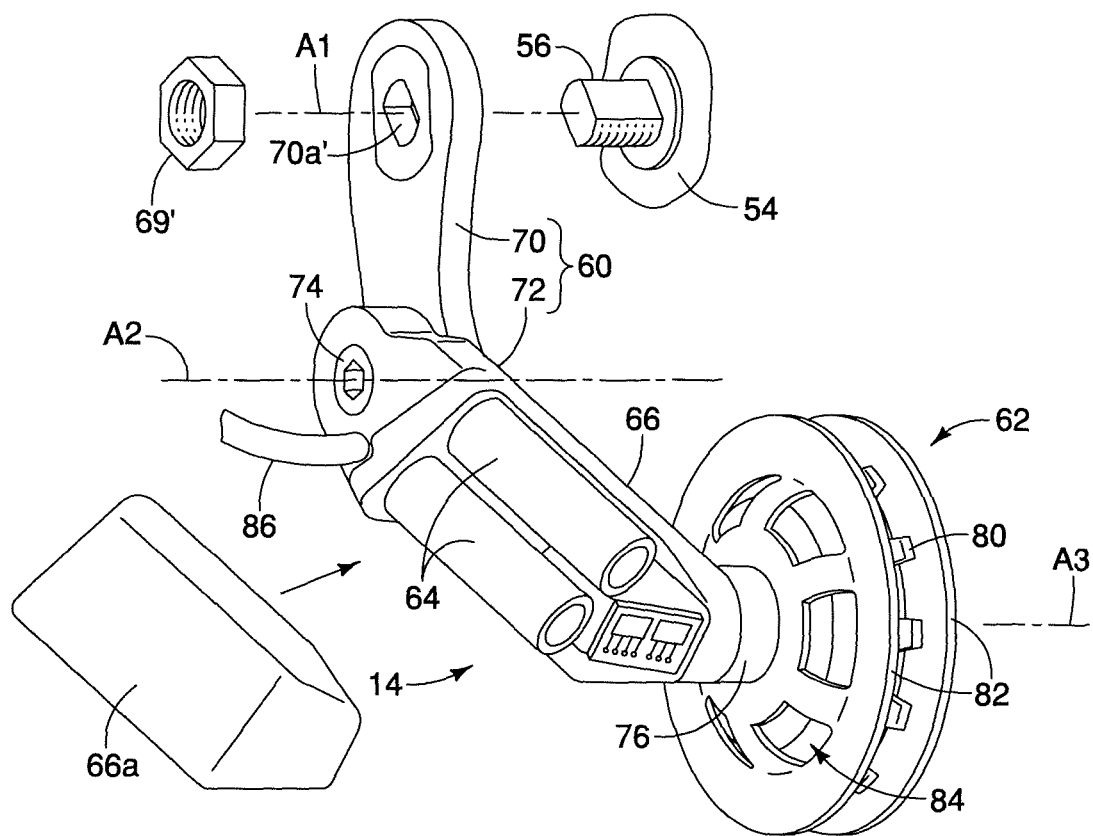
FIG. 6 is a perspective view of the bicycle chain tensioner device, with a cover removed and showing the bicycle chain tensioner device about to be mounted to the hub axle of the internally geared hub.

As seen in FIG. 4, the frame attachment portion 70 includes an opening 70a that is configured to receive the frame attachment bolt 69. The frame attachment bolt 69 extends through the opening 70a of the frame attachment portion 70 and threads into a threaded opening 16a of a hanger portion of the frame 16 to fixedly secure the frame attachment portion 70 directly to the frame 16. The center of the opening 70a corresponds to the mounting axis A1. Alternatively, as seen in FIG. 6, the frame attachment portion 70 can be mounted directly on the hub axle 56 and secured thereto by a nut 69' if needed and/or desired. As seen in FIG. 6, the frame attachment portion 70 has a non-circular opening 70a' that mates with the threaded end of the hub axle 56. Thus, in this case, the opening 70a' and the hub axle 56 are keyed to prevent rotation of the frame attachment portion 70 relative to the frame 16.

As seen in FIG. 4, the pulley member 62 is rotatably coupled to the arm portion 72. Thus, the arm portion 72 includes a pivot shaft 76 that rotationally supports the pulley member 62 about a pulley rotational axis A3. The pivot shaft 76 is disposed on the second end of the arm portion 72, which is at the opposite end of the arm portion 72 from the bolt 74 in a prescribed direction of the arm portion 72. As mentioned above, the arm portion 72 is rotationally coupled to the frame attachment portion 70 by the bolt 74 at the first end of the arm portion 72 about the rotational axis A2. The rotational axis A2 is offset from the pulley rotational axis A3. The electrical storage unit 64, the motor controller 66 and the shift communication unit 68 are all disposed on disposed on the arm portion 72. The electrical storage unit 64, the motor controller 66, the shift communication unit 68 and the power limit circuit 96 are covered by an arm cover 66a. The arm cover 66 is configured to prevent water and/or dust from contaminating the electrical storage unit 64, the motor controller 66, the shift communication unit 68 and the power limit circuit 96.

As seen in FIGS. 4 and 5, the pulley member 62 basically includes a pulley 80 and a pair of pulley guides 82. The pulley 80 includes a plurality of chain engagement teeth for engaging the bicycle chain 24. The pulley 80 is rotatably mounted on the pivot shaft 76 of the arm portion 72 to rotate about the pulley rotational axis A3. Thus, the pulley 80 is supported by the base member 60 on the frame 16. The pulley guides 82 are disc shaped members that are located on opposite axial sides of the pulley 80 to guide the chain 24 onto the pulley 80. The pulley guides 82 can be either non-rotatably or rotatably mounted on the pivot shaft 76 of the arm portion 72 as needed and/or desired.

The pulley member 62 also includes a dynamo 84 that generates electrical energy in response to the pulley 80 being rotated by the bicycle chain 24. The dynamo 84 is electrically connected to the electrical storage unit 64 for supply electrical energy to the electrical storage unit 64 that was generated by the dynamo 84. The electrical storage unit 64 and the motor controller 66 are all connected to the electric motor unit 48 by an electrical cable 86 as discussed below.

As seen in FIG. 5, the dynamo 84 basically includes a rotor 88, a stator 90 and a cover 92. The rotor 88 is fixed to the pulley 80 to rotate with the pulley 80. The stator 90 is non-rotatably mounted on the pivot shaft 76 of the arm portion 72. The cover 92 is secured to the tension pulley 80 by a snap-fit connection. The rotor 88 and the stator 90 are disposed in the space configured by the cover 92 and the tension pulley 80. The rotor 88 has a plurality of permanent magnets for creating a constant magnetic field. The stator 90 has a plurality of armature windings to generate the electric current as the armature windings passes through the magnetic field of the permanent magnets on the rotor 88. Thus, the rotor 88 and the stator 90 form an electric generator that uses electromagnetic principles to convert mechanical energy (rotation of the pulley 80) to electrical energy (alternating current). In particular, the rotor 88 rotates around the stator 90 to generate electrical energy in response to the pulley 80 being rotated by the bicycle chain 24.

As seen in FIG. 4, the electrical storage unit 64 (e.g., one or more batteries, accumulators or capacitors as shown) is mounted to the arm portion 72 of the base member 60. The electrical storage unit 64 constitutes an electrical energy storage device or storage element that serves as a power source for the internally geared hub 12 and other electrical bicycle components. The electrical storage unit 64 can be, for example, a nickel hydrogen battery or a lithium ion battery.

Preferably, as seen in FIG. 4, the arm portion 72 of the base member 60 has a printed circuit board (schematically illustrated in a very simplified form), which includes the motor controller 66 and the shift communication unit 68. As seen in FIG. 3, the shift communication unit 68 preferably has a wireless receiver 94 for conducting wireless communications with the transmitter 42 of the input device 34 as seen in FIG. 3. Thus, the wireless receiver 94 wirelessly receives a shift signal from the transmitter 42 when the rider operates one of the switches 40 of the input device 34 as seen in FIG. 3. However, the receiver of the shift communication unit 68 can be a wired to the transmitter 42 of the input device 34 as seen in FIG. 2. Also, in this illustrated embodiment, the printed circuit board also includes a power limit circuit 96 that includes a rectifier circuit 98 for converting the alternating current (AC) produced by the dynamo 84 to direct current (DC). The power limit circuit 96 can be a part of the motor controller 66, as shown, or can be a separate chip on the printed circuit board As seen in FIG. 3, the motor controller 66 is electrically coupled to the electrical storage unit 64 to receive electrical energy stored in the electrical storage unit 64. The electric motor 50 is also operatively coupled to the motor controller 66 to operate in response to a control signal from the motor controller 66. Specifically, the motor controller 66 operates the electric motor 50 by controlling the supply of the electrical energy stored in the electrical storage unit 64 to the electric motor 50 based on the signal from the potentiometer 52. The motor controller 66 includes a central processing unit (CPU) and a motor driver. As the motor controller 66 operates the electric motor 50, the motor controller 66 detects the voltage of the electrical storage unit 64. If the voltage of the electrical storage unit 64 is lower than a predetermined value as determined by the motor controller 66, then the motor controller 66 does not operates the electric motor 50. The motor controller 66 preferably is configured to include a sleep mode, when the receiver 94 of the shift communication unit 68 does not receive a switch signal (upshift or downshift signal) from the switches 40 for predetermine time, then the motor controller 66 enters the sleep mode to conserve energy. The motor controller 66 also enters the sleep mode, when the motor controller 66 does not detect velocity signal that is outputted by the dynamo 84 for a predetermine time. In other word, if the pulley 80 does not move for a predetermine time, then the motor controller 66 enters a sleep mode. During the sleep mode, the motor controller 66 shuts down and stops monitoring the potentiometer 52 and/or communicating with the shift communication unit 68. Once the receiver 94 of the shift communication unit 68 receives a switch signal (upshift or downshift signal) from the switches 40, the switch signal is inputted to the motor controller 66 so the motor controller 66 can wake up quickly. Also once the pulley 80 starts to rotate again, the velocity signal from the dynamo 84 is inputted to the motor controller 66 so the motor controller 66 can wake up quickly when the chain 24 is moved.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having"

and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa.

In illustrated embodiment, the motor controller 66 and the shift communication unit 68 are disposed on the base member 60. However, the motor controller and/or the shift communication unit may be disposed on the motor unit 48.

In illustrated embodiment, the motor controller 66, the shift communication unit 68, the power limit circuit 96 and the electrical storage unit 64 are disposed on the arm portion 72. However, at least one of the motor controller 66, the shift communication unit 68, the power limit circuit 96 and the electrical storage unit 64 is disposed on the frame attachment portion 70.

The shift communication unit 68 may be disposed on substantially the second end of the arm portion 72 which is close to the transmitter 42 as shown or in other locations on the arm portion 72 as needed and/or desired. Also the motor controller 66, the shift communication unit 68, the power limit circuit 96 and the electrical storage unit 64 may be disposed in other locations on the arm portion 72. By locating the motor controller 66, the shift communication unit 68, the power limit circuit 96 and the electrical storage unit 64 on opposite side from the pulley 62 in the axis A3 direction, the electrical components are prevented from being hit by the chain 24.

In illustrated embodiment, the bicycle chain tensioner device 14 has only the pulley 62. However, the bicycle chain tensioner device 14 may be provided with a plurality of pulleys disposed on the base member 60. Each of these pulleys may include the dynamo 84 that is operated by the chain 24 to generate electrical energy.

In illustrated embodiment, the bicycle chain tensioner device 14 is illustrated as being disposed on a rear portion of a bicycle. However, the bicycle chain tensioner device 14 may be disposed in other locations such as near the front sprocket.

The shift communication unit 68 may transmit information of the current position of the speed state to the computer unit 30 via the input device 34 or the wiring harness 36. The computer unit 30 may display the information of the current position on the display.

When the computer unit 30 is connected to the bicycle chain tensioner device 14 by the wiring harness 36 and to the input device 34 by the wire 38, the electrical storage unit 64 can supply electrical power to the computer unit 30 and the input device 34.

Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle shifting system comprising:
    an internally geared hub including a bicycle hub transmission including at least a hub shell and a motor unit, the hub shell being configured to rotate around a rotational axis;
    a base member configured to be attached to the internally geared hub;
    a pulley supported by the base member and arranged to engage with a bicycle chain, the pulley including a dynamo that generates electrical energy in response to the pulley being rotated by the bicycle chain;
    an electrical storage unit that is disposed on the base member, the electrical storage unit being electrically coupled to the motor to supply power to the motor, and the electrical storage unit being electrically coupled to the dynamo to store electrical energy generated by the dynamo; and
    an AC-to-DC rectifying device disposed on the base member to rectify electric current generated by the dynamo, the AC-to-DC rectifying device being coupled to the electric storage unit.

2. The bicycle shifting system according to claim 1, wherein
    the pulley includes a plurality of chain engagement teeth for engaging a bicycle chain.

3. The bicycle shifting system according to claim 2, wherein
    the base member includes an attachment portion that is configured to be supported on the internal hub unit and an arm portion that rotationally supports the pulley about a pulley rotational axis.

4. The bicycle shifting system according to claim 3, wherein
    the arm portion is rotationally coupled to the attachment portion about a rotational axis that is offset from the pulley rotational axis.

5. The bicycle shifting system according to claim 3, wherein
    the electrical storage unit is disposed on the arm portion.

6. The bicycle shifting system according to claim 1, wherein
    the base member includes a hub axle mounting opening.

7. The bicycle shifting system according to claim 1, wherein
    the electrical storage unit includes at least one of a capacitor and a battery.

8. The bicycle shifting system according to claim 1, further comprising
    a motor controller electrically coupled to the electrical storage unit to control the motor of the internally geared hub.

9. The bicycle shifting system according to claim 8, further comprising
    a shift communication unit coupled to the motor controller and including a wireless receiver that wirelessly receives a shift signal.

10. A bicycle shifting system comprising:
    a base member including an attachment portion configured to be fixedly secured to a stationary portion of a bicycle and an arm portion having a first end and a second end, the first end being adjustably fixed to the attachment portion;

a pulley that is rotationally supported on the second end of the arm portion about a pulley rotational axis and arranged to engage with a bicycle chain, the pulley having a plurality of chain engagement teeth for engaging the bicycle chain and a dynamo that generates electrical energy in response to the pulley being rotated by the bicycle chain;

an electrical storage unit that is disposed on the base member as a power source, the electrical storage unit being electrically coupled to the dynamo to store electrical energy generated by the dynamo, and the electrical storage unit being configured to be electrically coupled to an electrical component to supply electrical energy to the electrical component;

an AC-to-DC rectifying device disposed on the base member to rectify electric current generated by the dynamo, the AC-to-DC rectifying device being coupled to the electric storage unit;

an internally geared hub including a motor unit and a bicycle hub transmission, the bicycle hub transmission including at least a hub shell, the hub shell being configured to rotate around a rotational axis; and a motor controller configured to control the motor unit, and being electrically connected in parallel to the electrical storage unit and AC-to-DC rectifying device.

11. The bicycle shifting system according to claim 10, wherein
the attachment portion is attached to a frame of the bicycle using a bolt.

12. The bicycle shifting system according to claim 10, wherein
the attachment portion is secured to a hub axle of the bicycle using a nut.

13. The bicycle shifting system according to claim 10, wherein
the electric storage unit and the AC-to-DC rectifying device are disposed on the arm portion.

14. The bicycle shifting system according to claim 13, wherein
the electrical storage unit supplies electrical energy to an electric motor arranged to actuate a shift operation a gear of a hub transmission.

15. The bicycle shifting system according to claim 14, further comprising
a shift communication unit that is arranged on the base member and configured to wirelessly receive a shift signal from a gear shifter device operated by a user and communicate the shift signal to the motor controller for controlling the electric motor.

16. The bicycle shifting system according to claim 15, wherein
the arm portion is pivotally shiftably coupled to the attachment portion, and
the motor controller and the shift communication unit are arranged on the arm portion.

* * * * *